(12) United States Patent
Chen et al.

(10) Patent No.: US 7,577,491 B2
(45) Date of Patent: Aug. 18, 2009

(54) SYSTEM AND METHOD FOR EXTRACTING PARAMETERS OF A CUTTING TOOL

(75) Inventors: Tian Chen, Shanghai (CN); Kevin George Harding, Niskayuna, NY (US); Zhongguo Li, Shanghai (CN); Jianming Zheng, Shanghai (CN); Steven Robert Hayashi, Niskayuna, NY (US); Xiaoming Du, Shanghai (CN)

(73) Assignee: General Electric Company, Niskayuna, NY (US)

( * ) Notice: Subject to any disclaimer, the term of this patent is extended or adjusted under 35 U.S.C. 154(b) by 280 days.

(21) Appl. No.: 11/289,912

(22) Filed: Nov. 30, 2005

(65) Prior Publication Data

US 2007/0124015 A1 May 31, 2007

(51) Int. Cl.
*G06F 19/00* (2006.01)
*G01B 5/20* (2006.01)

(52) U.S. Cl. .................. 700/175; 700/195; 702/167

(58) Field of Classification Search .................. 700/175, 700/177, 195; 702/167
See application file for complete search history.

(56) References Cited

U.S. PATENT DOCUMENTS

2005/0094879 A1  5/2005  Harville

FOREIGN PATENT DOCUMENTS

WO          03062745        7/2003

OTHER PUBLICATIONS

H. Woo, E. Kang, Semyung Wang, Kwan H. Lee. "A New Segmentation Method for Point Cloud Data". International Journal of Machine Tools & Manufacture 42 (2002): 167-178.*
WO 03/062745 (machine translation).*
Y. H. Chen, C. Y. Liu. "Robust Segmentation of CMM Data Based on NURBS". International Journal of Advanced Manufacturing Technology 13 (1997): 530-534.*
K. G. Harding, "High resolution contouring for CAD data generation and verification," Institute of electrical and Electronics Engineers, Proceedings of the National Aerospace and Electronics Conference, May 18-22, 1992, IEEE New York, vol. 2, Conf. 44, pp. 1223-1229.
Tsuneo Kagawa, Hiroaki Nishino, Kouichi Utsumiya; "A Sensitive Coloring and Texture Mapping on 3D Shapes"; 2004 IEEE International Conference on Systems, Man and Cybernetics; pp. 5748-5753.
Charlie C. L. Wang, Terry K. K. Chang, Matthew M. F. Yuen; "From laser-scanned data to feature human model: a system based on fuzzy logic concept"; Computer-Aided Design 35(3): 241-253 (2003).

* cited by examiner

*Primary Examiner*—Ryan A Jarrett
(74) *Attorney, Agent, or Firm*—Patrick K. Patnode

(57) ABSTRACT

A method for extracting parameters of a cutting tool is provided. The method includes obtaining a measurement data set having a point cloud corresponding to a surface of the cutting tool and virtually slicing the point cloud at a pre-determined section to obtain a set of points on the pre-determined section. The method also includes generating a plurality of curves through the set of points and optimizing the plurality of curves to generate optimized fitting curves and extracting the parameters of the cutting tool from the optimized fitting curves. Furthermore, based on the presented rotary angle projection technique, a plurality of parameters can be extracted for the cutting tool.

29 Claims, 13 Drawing Sheets

SYSTEM AND METHOD FOR EXTRACTING PARAMETERS OF A CUTTING TOOL

BACKGROUND

The invention relates generally to cutting tools for machining parts, and particularly to extraction of parameters for such cutting tools.

Various types of cutting tools are known and are in use for machining parts. Typically, each cutting tool has associated parameters to define the shape and profile of the cutting tool. Further, the performance of the machined parts depends upon such parameters. For example, a ball end mill has associated parameters such as axial primary relief angle, flute spacing, ball end radius and so forth. It is required to inspect the cutting tools from time-to-time for ensuring a desired performance of such tools. In general, the parameters associated with such tools are estimated and compared to desired values for determining the cutting performance of such tools. Particularly, it is desirable to determine such parameters for complex cutters having features defined by these parameters.

Typically, the physical part is sliced and an optical comparator or a hard gage is employed to measure the parameters at any section of the sliced part. However, this technique requires physical slicing of the tools thereby making them unusable for future machining. Certain other systems employ image processing techniques for estimating the tool parameters from captured projections. However, such measurement systems are limited to estimation of only the minority parameters for the tool and are unable to provide measurements for all of the parameters associated with the tool. Further, existing parameter measurement techniques for the cutting tools are time consuming, are relatively expensive and have relatively less accuracy.

Accordingly, it would be desirable to develop an improved technique for determining tool parameters for cutting tools. Particularly, it will be advantageous to develop a technique for accurate estimation of the tool parameters without damaging the tool.

BRIEF DESCRIPTION

Briefly, according to one embodiment a method for extracting parameters of a cutting tool is provided. The method includes obtaining a measurement data set having a point cloud corresponding to a surface of the cutting tool and virtually slicing the point cloud at a pre-determined section to obtain a set of points on the pre-determined section. The method also includes generating a plurality of curves through the set of points and optimizing the plurality of curves to generate optimized fitting curves and extracting the parameters of the cutting tool from the optimized fitting curves.

In another embodiment, a system for extracting parameters of a cutting tool is provided. The system includes a 3D measurement device configured to scan a surface of the cutting tool and to acquire a point cloud corresponding to the surface and a virtual slicing module configured to slice the point cloud to obtain a set of points at a pre-determined section. The system also includes a curve fitting and optimization module configured to generate a plurality of curves through the set of points and to optimize the plurality of curves by minimizing deviations between the set of points and the plurality of curves and a parameter extraction module configured to extract the parameters of the cutting tool from the optimized curves.

In another embodiment, a method for virtually slicing a point cloud corresponding to a surface of a cutting tool is provided. The method includes pre-processing the point cloud via a filter to generate a first set of points and selecting a slicing plane for segmenting the first set of points. The method also includes projecting the first set of points to the selected slicing plane to generate a second set of points at a specified section.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
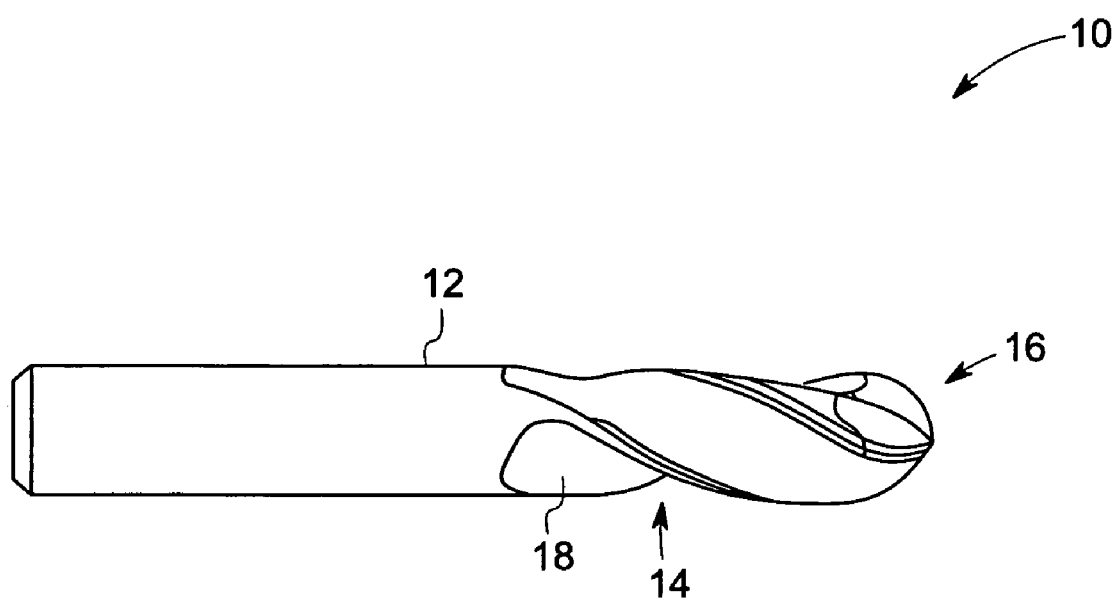
FIG. 1 is a diagrammatical illustration of a cutting tool employed for machining parts in accordance with aspects of the present technique.

As discussed in detail below, embodiments of the present technique function to provide a technique for extraction of parameters of cutting tools employed in various applications such as ball end mill, flat end mill, drill and reamer. In particular, the present technique employs a virtual slicing technique for slicing a measurement point set and extraction of parameters via global curve fitting through the set of points obtained from the slicing or through a set of points obtained directly from line-scanning measurement. Turning now to drawings and referring first to FIG. 1, a cutting tool 10 is illustrated. In the illustrated embodiment, the cutting tool 10 comprises a ball end mill. The ball end mill 10 is employed as a cutting tool in a vertical mill such as a mini-mill. As illustrated, the ball end mill 10 includes a shank 12 and a cylindrical cutting area 14. Further, the ball end mill 10 has a rounded tip 16 for milling grooves with a semi-circular cross-section.

The cutting area 14 includes a plurality of flutes 18 based upon a desired profile of the machined part and a plurality of cutting edges. For example, a 2-flute mill may be employed for cutting slots or grooves. Similarly, a 4-flute mill may be employed for a surface milling operation. The ball end mill 10 has a plurality of parameters corresponding to the cylindrical cutting area 14 and the rounded tip 16 that are representative of cutting performance of the mill 10. Examples of such parameters include, but are not limited to, axial primary relief angle, flute spacing, radial primary relief angle, radial rake angle, ball end radius, concentricity, core diameter, axial gash angle, axial rake angle, axial secondary clearance angle, helix angle, radial secondary clearance angle and shank diameter. The parameter extraction of such parameters to assess the cutting performance of the ball end mill will be described in detail below.

Figure 2:
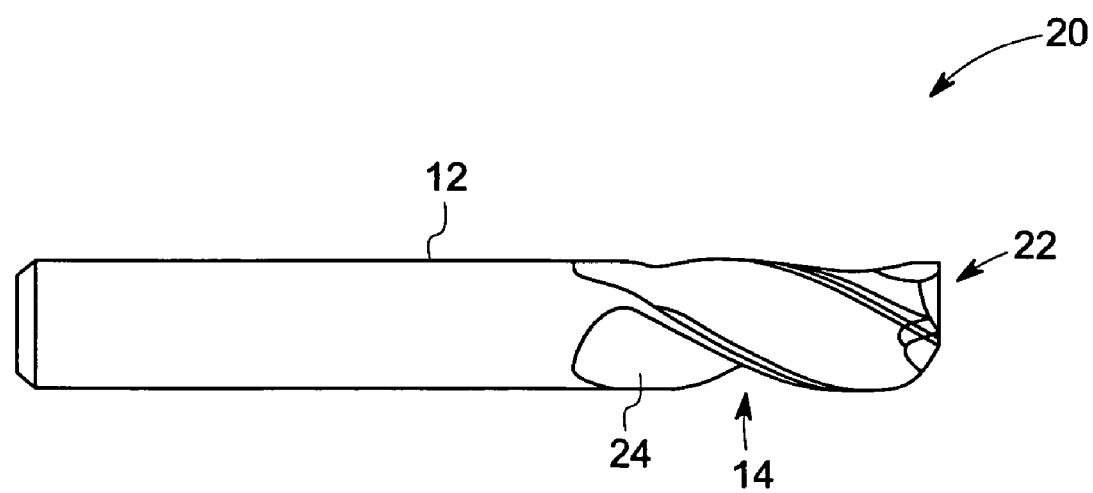
FIG. 2 is a diagrammatical illustration of another cutting tool employed for machining parts in accordance with aspects of the present technique.

FIG. 2 is a diagrammatical illustration of another cutting tool 20 employed for machining parts. In this embodiment, the cutting tool 20 comprises a flat end mill. Again, the flat end mill 20 includes the shank 12 and the cylindrical cutting area 14, which cutting area 14 includes a flat tip 22. Further, the flat end mill 20 may include a plurality of flutes 24 depending upon a machining requirement. As described earlier, a plurality of parameters associated with the cylindrical cutting area 14 are indicative of the cutting performance of the cutting tool 20. The extraction of such parameters via a virtual slicing and curve fitting technique will be described below with reference to FIG. 3.

Figure 3:
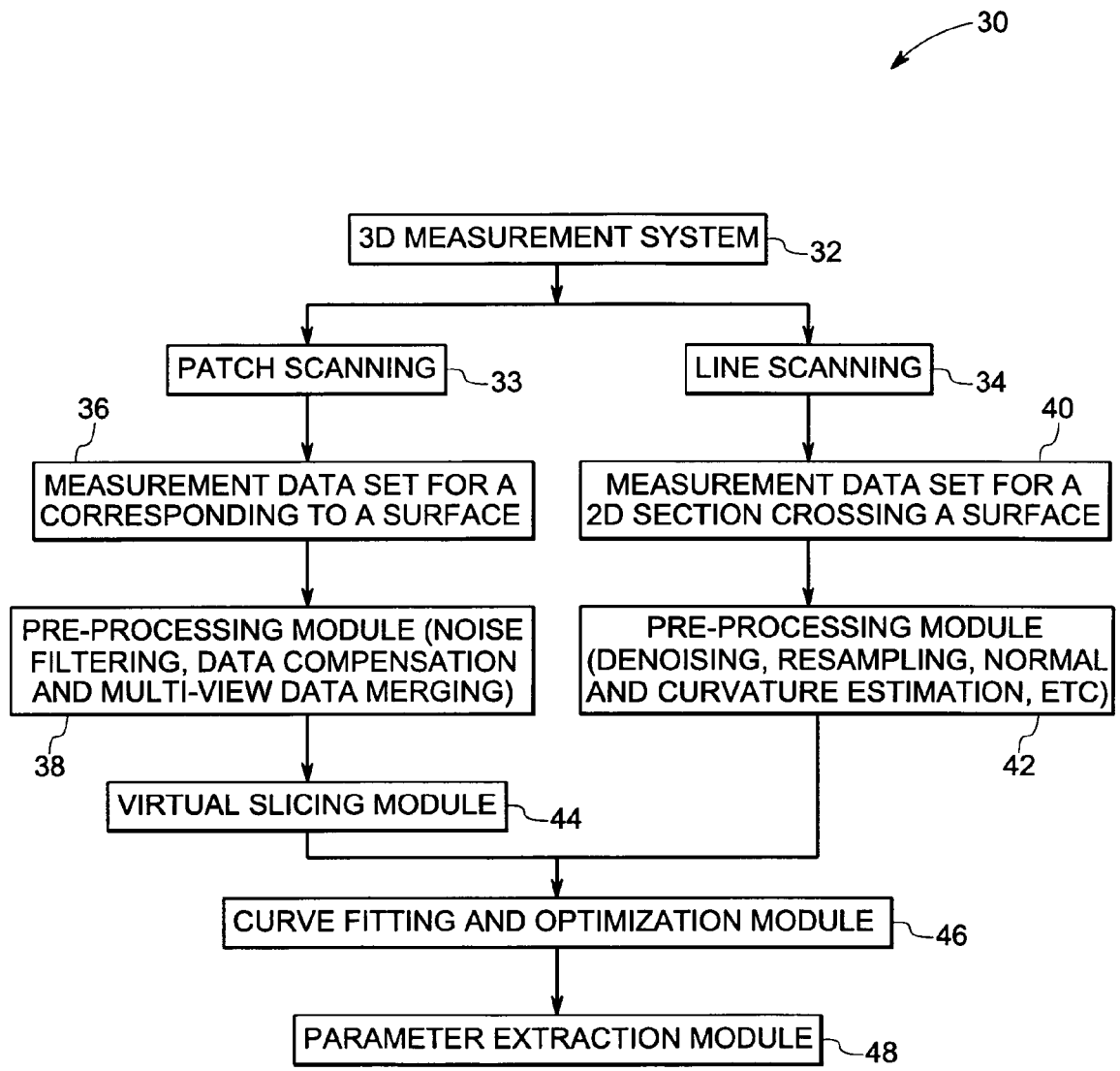
FIG. 3 is a diagrammatical illustration of an exemplary system 30 for parameter extraction of the cutting tools of FIGS. 1 and 2 in accordance with aspects of the present technique.

FIG. 3 is a diagrammatical illustration of an exemplary system 30 for parameter extraction of the cutting tools such as ball and flat end mills 10 and 20 of FIGS. 1 and 2. In the illustrated embodiment, a measurement data set is obtained via a three-dimensional (3D) data measurement system 32. Examples of the 3D data measurement system 32 include a laser scanner system, a white light 3D system, a contact probe system and so forth. In the illustrated embodiment, the 3D data measurement system 32 is configured to perform a patch scanning or a line scanning as represented by reference numerals 33 and 34. In one embodiment, the patch scanning 33 is performed to obtain a measurement data set 36 corresponding to a surface, as represented by reference numeral 36. Further, the measurement data set 36 is pre-processed via a pre-processing module 38 to perform noise filtering, data compensation and multi-view data merging operations prior to virtual slicing of the point cloud 32. Similarly, the line scanning 34 may be performed to obtain a measurement data set 40 for a two-dimensional (2D) section crossing a surface. Furthermore, the measurement data set 40 may be pre-processed via a pre-processing module 42 for denoising, resampling, estimation of normal and curvature and so forth. The pre-processed set of points from the pre-processing module 38 is virtually sliced via a virtual slicing module 44 to obtain a set of points at a pre-determined section. Additionally, the set of points at the pre-determined section is processed via a curve fitting and optimization module 46 to generate a plurality of curves through the set of points and to optimize the plurality of curves by minimizing deviations between the set of points and the plurality of curves. Subsequently, the generated curves are processed by a parameter extraction module 48 to extract the parameters of the cutting tool from the optimized curves. The virtual slicing, curve fitting and optimization and parameter extraction techniques will be described below.

Figure 4:
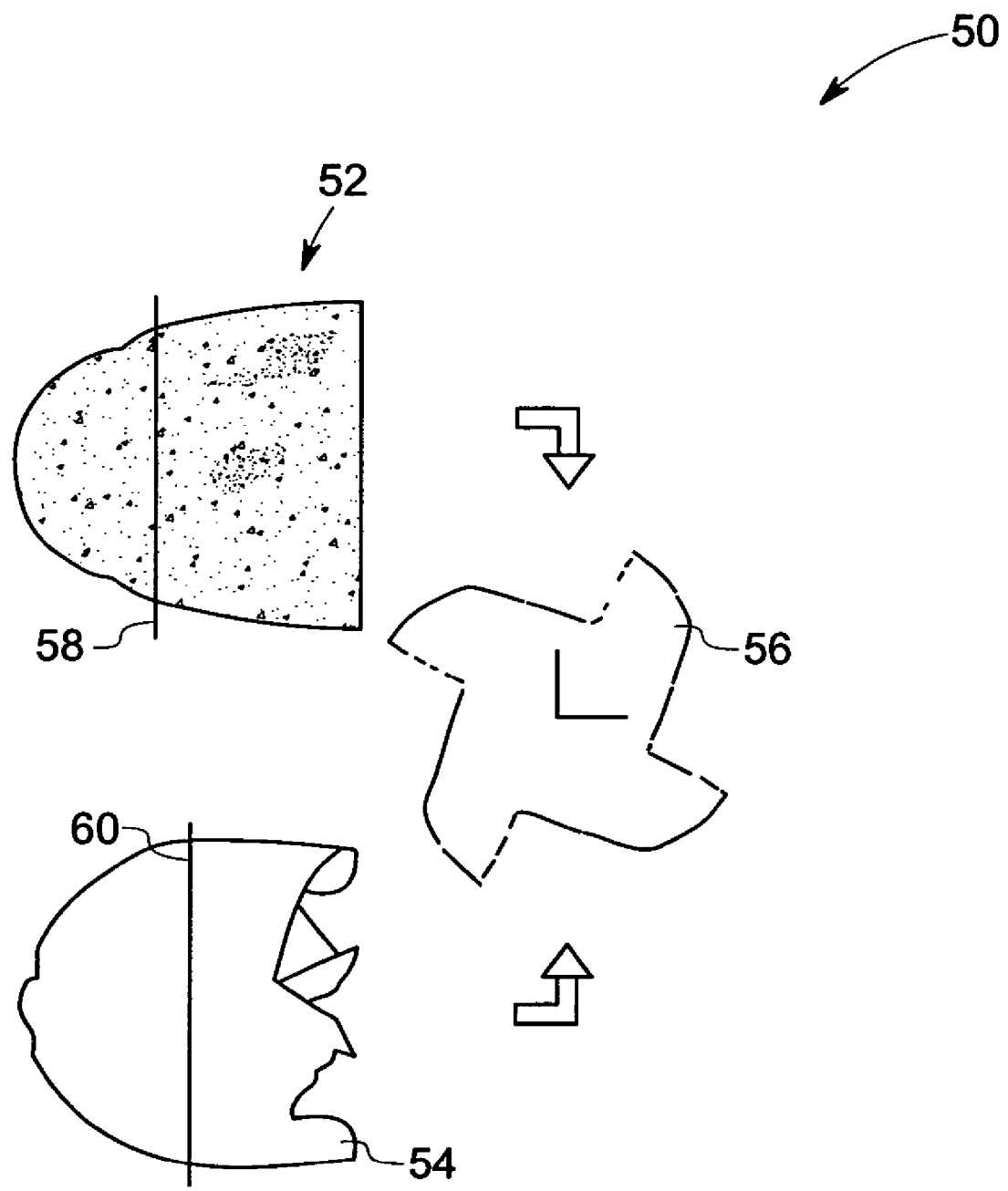
FIG. 4 is a diagrammatical illustration of an exemplary virtual slicing pattern for a point cloud and a triangular mesh model corresponding to a surface of the cutting tools of FIGS. 1 and 2 in accordance with aspects of the present technique.

FIG. 4 is a diagrammatical illustration of an exemplary virtual slicing pattern 50 for a point cloud 52 and a triangular mesh model 54 corresponding to a surface of the cutting tools 10 and 20 of FIGS. 1 and 2 via the system of FIG. 3. In the illustrated embodiment, a measurement data set having the point cloud 52 is obtained via the 3D data measurement system 32 (see FIG. 3). Further, the point cloud 52 is virtually sliced via the virtual slicing module 44 (see FIG. 3) to obtain a set of points 56 on a pre-determined section. In this embodiment, the virtual slicing module 44 is configured to perform axial or radial slicing, or a pre-determined direction plane slicing of the point cloud 52. In certain embodiments, the point cloud 52 is pre-processed via the pre processing module 38 (see FIG. 3) prior to virtual slicing of the point cloud 52. In one embodiment, the virtual slicing of the point cloud 52 includes plane slicing. Alternatively, the virtual slicing of the point cloud 52 includes surface slicing. Based upon the desired parameter extraction, the point cloud 52 may be sliced by employing radial slicing or axial slicing to generate the set of points 56. As will be appreciated by one skilled in the art the triangular mesh model 54 may be virtually sliced in a similar fashion via the system 30 of FIG. 3. Further, the virtual slicing module 44 is configured to slice the point cloud 52 or the triangular mesh 54 based upon a defined slicing thickness, or a user-defined section.

In operation, a desired slicing section such as represented by reference numerals 58 and 60 is selected by a user for extracting a particular cutting tool parameter. Further, the user may specify a slicing thickness for slicing. In the illustrated embodiment, the slicing thickness depends upon a point density of the point cloud 52. In this embodiment, the density of the measurement data should be substantially high.

In certain embodiments, the virtual slicing module 44 is configured to estimate the point density of the point cloud 52 and to provide a preferred value of the slicing thickness. Alternatively, the user may reset the estimated value of the slicing thickness to a desired slicing thickness. The virtual slicing module 44 is configured to obtain the set of points 56 around the slicing plane 58 and the offset of the points from the slicing plane 58 is substantially the same as half of the selected slicing thickness. Subsequently, all the obtained points are projected to the same slicing plane 52 to obtain the set of points 56.

Similarly, for the triangular mesh model 54, the virtual slicing module 44 determines intersection points between the slicing plane 60 and borders of each triangle of the model 54 if the slicing plane 60 passes though the respective triangle plane. In certain embodiments, the virtual slicing module 44 facilitates selection of a user-defined section based upon a normal section and a respective crossing point for virtual slicing of the point cloud 52. The radial and axial slicing of the point cloud 52 facilitates extraction of the radial and axial parameters for the cutting tools 10 and 20. In certain embodiments, the virtual slicing module 44 employs cylindrical slicing of the point cloud 52 as described below with reference to FIG. 5.

Figure 5:
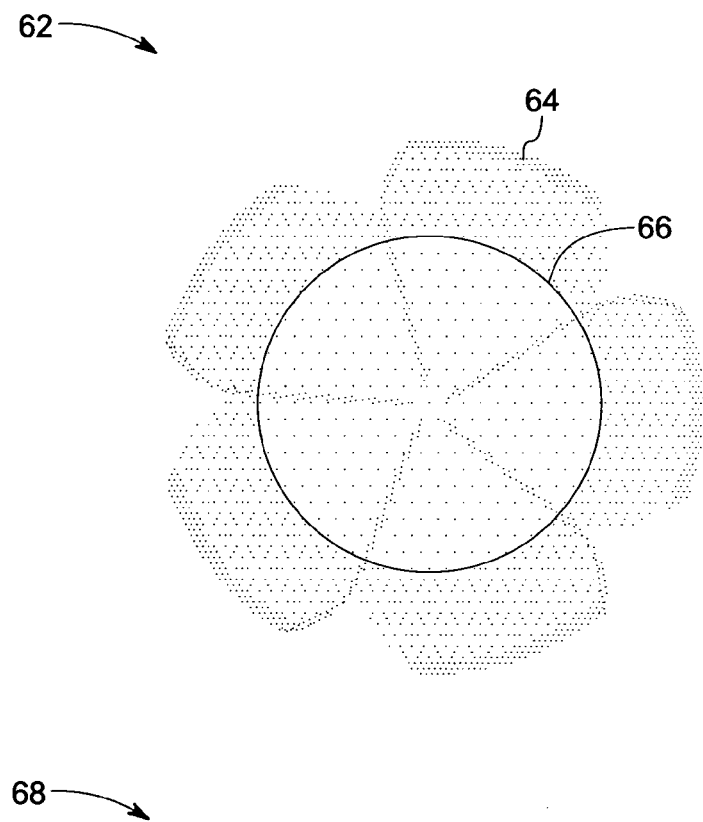
FIG. 5 is a diagrammatical illustration of an exemplary cylindrical slicing pattern for a point cloud corresponding to a surface of the cutting tools of FIGS. 1 and 2 in accordance with aspects of the present technique.
Figure 5:
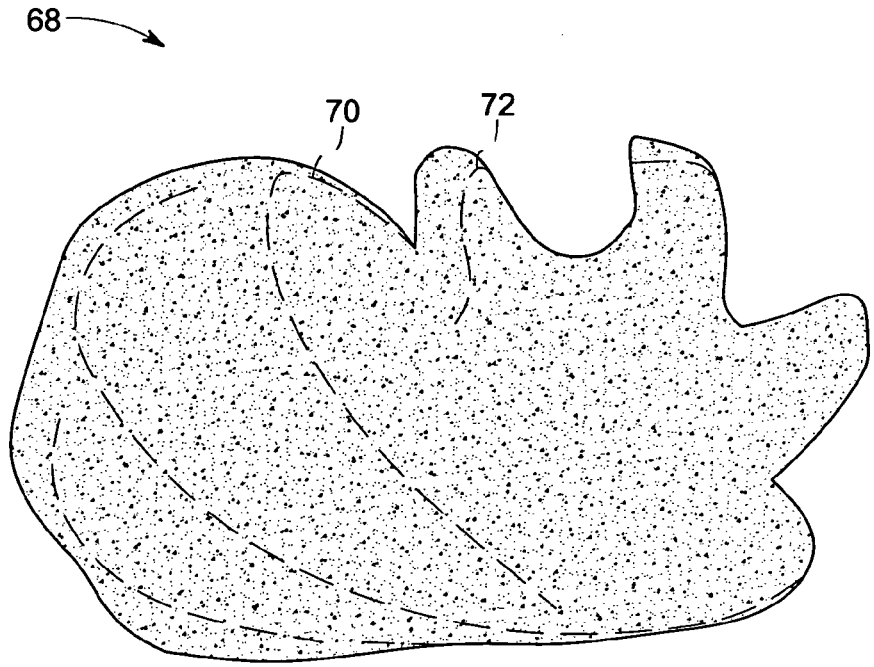

FIG. 5 is a diagrammatical illustration of an exemplary cylindrical slicing pattern 62 for a point cloud corresponding to a surface of the cutting tools 10 and 20 of FIGS. 1 and 2. The cylindrical slicing interface is similar to the radial and axial slicing interfaces described above. It should be noted that cylindrical slicing is employed for cirque extraction where the cylinder radius is pre-determined. In the illustrated embodiment, a point cloud 64 is sliced via a section 66 to obtain a sliced pattern 68. The sliced pattern 68 includes helix curves such as represented by reference numerals 70 and 72 that are obtained via twice cylindrical slicing on different positions. Based on the helix curves 70 and 72 a required flute helix property may be obtained for the tools 10 and 20. In particular, the flute-number points on any cutting edge of the tools 10 and 20 may be determined from the helix curves 70 and 72 based upon a pre-determined radius. Additionally, axial slicing may be performed at the pre-determined radius as described below.

Figure 6:
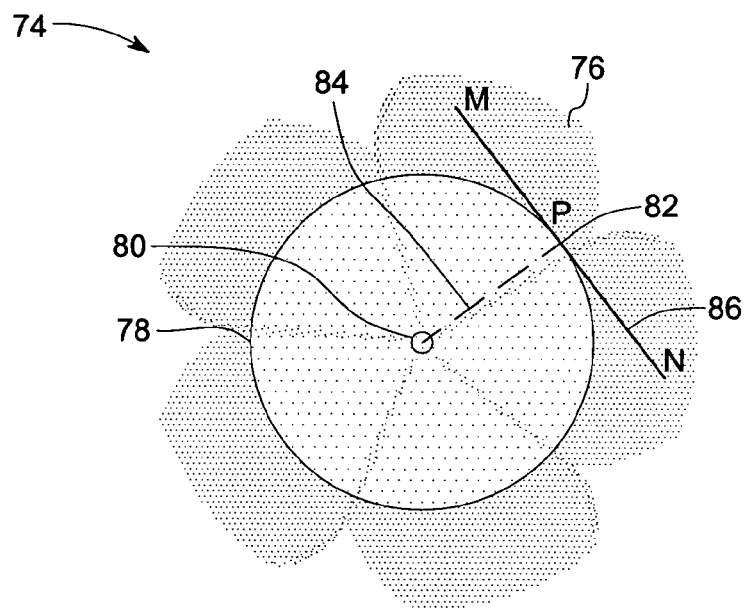
FIG. 6 is a diagrammatical illustration of an axial section obtained from cylindrical slicing of a 5-flute flat end mill in accordance with aspects of the present technique.

FIG. 6 is a diagrammatical illustration of an axial section 74 obtained from cylindrical slicing of a 5-flute flat end mill. In the illustrated embodiment, a point cloud 76 is sliced via a slicing section 78. In this embodiment, point (O) 80 represents the center of the section 78. Further, a point (P) 82 is determined on the cutting edge of the cutting tools 10 and 20 having the pre-determined radius. In this embodiment, the pre-determined radius is equal to the length 84 of the line segment OP. It should be noted that the axial section is parallel to the shank axis and is perpendicular to the line segment OP. Thus, in the illustrated embodiment, the axial projection of the axial section, which is crossing point (P) 82 is represented by segment (MN) 86. As will be appreciated by one skilled in the art, five axial sections with the same cutting radius may be extracted for the 5-flute flat end mill.

Figure 7:
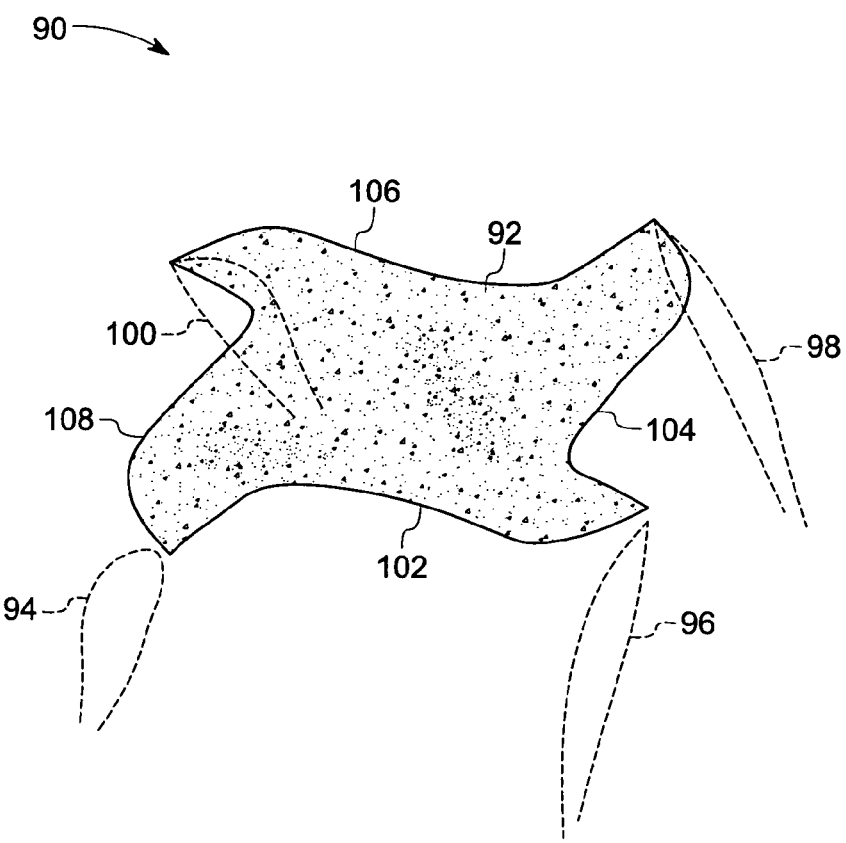
FIG. 7 is a diagrammatical illustration of axial and radial sections obtained from radial and axial slicing of a point cloud corresponding to a cutting edge of a 4-flute ball end mill of FIG. 1 in accordance with aspects of the present technique.

FIG. 7 is a diagrammatical illustration of axial and radial sections 90 obtained from cylindrical slicing of a point cloud 92 corresponding to a cutting edge of a 4-flute ball end mill. The axial and radial sections 90 for the 4-flute ball end mill may be determined in a similar manner as for the 5-flute mill described above. In the illustrated embodiment, axial sections sliced from the 4-flute ball end mill are represented by reference numerals 94, 96, 98 and 100. Moreover, corresponding radial sections are indicated by reference numerals 102, 104, 106 and 108. In operation, the required axial and radial sections are obtained from the point cloud 92 and such sections are utilized for estimating the parameters for the cutting tool based upon a curve fitting and optimization technique that will be described below with reference to FIG. 8.

Figure 8:
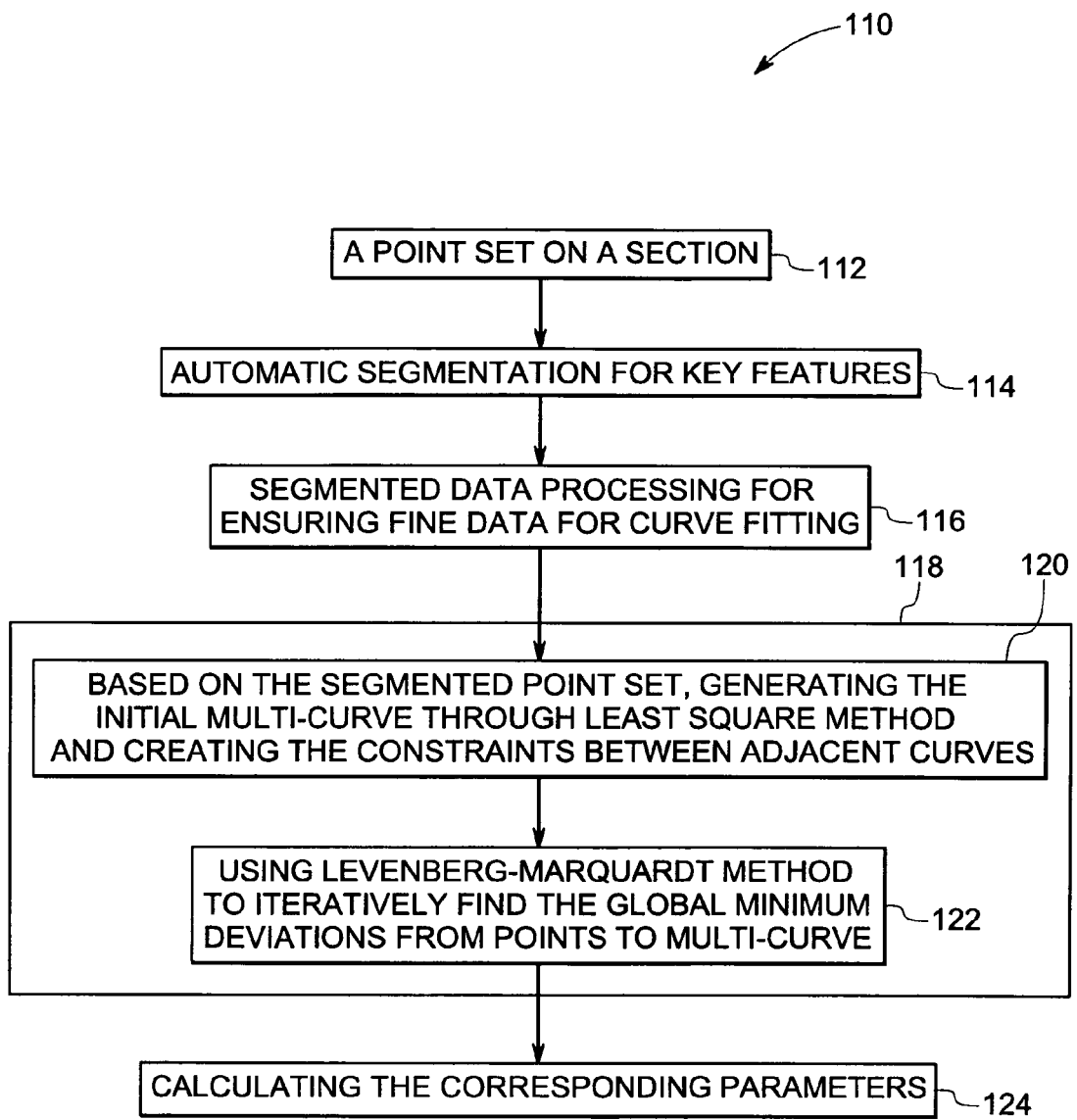
FIG. 8 is a diagrammatical illustration of an exemplary process of curve fitting through a set of points obtained from virtual slicing of a point cloud in accordance with aspects of the present technique.

FIG. 8 is a diagrammatical illustration of an exemplary process 110 of curve fitting through a set of points obtained from virtual slicing of the point cloud 92 (see FIG. 7). In the illustrated embodiment, a point set on a pre-determined section is obtained via virtual slicing of the point cloud, as represented by step 112. Further, an automatic segmentation of key features is performed (step 114). It should be noted that the number of key features to be segmented is based upon a flute number of the cutting tool 10 and 20. At step 116, the segmented data is processed to obtain fine data for curve fitting. Moreover, curve fitting and optimization operations are performed on the obtained data (step 118). In particular, initial multi curves are generated based on the segmented point set. In this embodiment, the curve generation is performed based upon a least-square method. However, other curve fitting techniques are envisaged.

Once the curves are generated, constraints between adjacent curves are created (step 120). Examples of curves employed for curve fitting include a spline, a line and an arc. At step 122, an optimization method is employed to determine the optimized curves. In the illustrated embodiment, Levenberg-Marquardt method is employed to iteratively find the global minimum deviations from the points to the curves for generating the optimized curves. However, other optimization techniques may be employed to generate the optimized curves. The optimized curves are then utilized for estimation of the cutting tool parameters (step 124) as will be described below.

Figure 9:
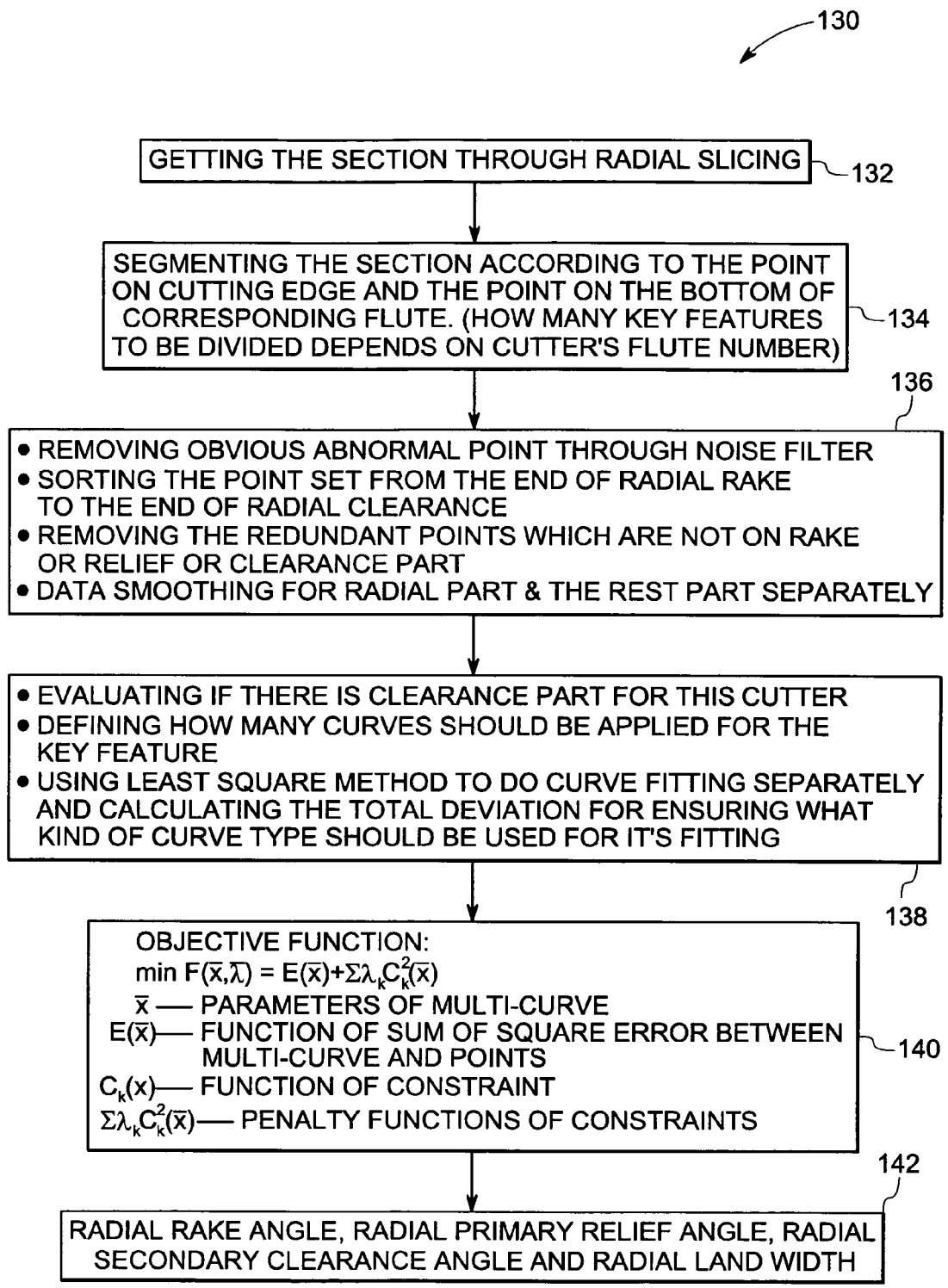
FIG. 9 is a diagrammatical illustration of an exemplary process of curve fitting through a set of points obtained from radial slicing of a point cloud or two-dimensional section data from line-scanning in accordance with aspects of the present technique.

FIG. 9 is a diagrammatical illustration of an exemplary process 130 of curve fitting through a set of points obtained from radial slicing of the point cloud 32 (see FIG. 3). In the illustrated embodiment, the curve fitting and parameter extraction techniques are employed to determine radial parameters for the cutting tools 10 and 20. The point cloud 32 obtained from measurement data is radially sliced to get a section (step 132). Further, the obtained section is segmented according to a point on the cutting edge and a point on the bottom of a corresponding flute (step 134). At step 136, the segmented data is preprocessed to obtain fine data for curve fitting. For example, a noise filter may be employed to remove any obvious abnormal point from the segmented data. In one embodiment, a sorting may be performed from the end of radial rake to the end of radial clearance of the edge. In another embodiment, redundant points that are not positioned on rake, or on relief, or on clearance part are removed. Further, data smoothing may be performed for radial and rest part respectively.

At step 138, the initial multi-curve is generated based on the segmented point set. In this embodiment, the system evaluates if there is a clearance part for the cutting tool. Further, a number of curves to be applied for any key feature is determined and the least-square method is employed for performing the curve fitting separately and for estimating the total deviation to facilitate determination of the type of curve to be employed. The generated curves are then optimized via the Levenberg-Marquardt method based upon an objective function as described in step 140. Subsequently, the parameters are estimated from the optimized curves (step 142). In this embodiment, the parameters include radial rake angle, radial primary relief angle, radial secondary clearance angle and radial land width. However, a plurality of other parameters may be estimated via the technique described above.

Figure 10:
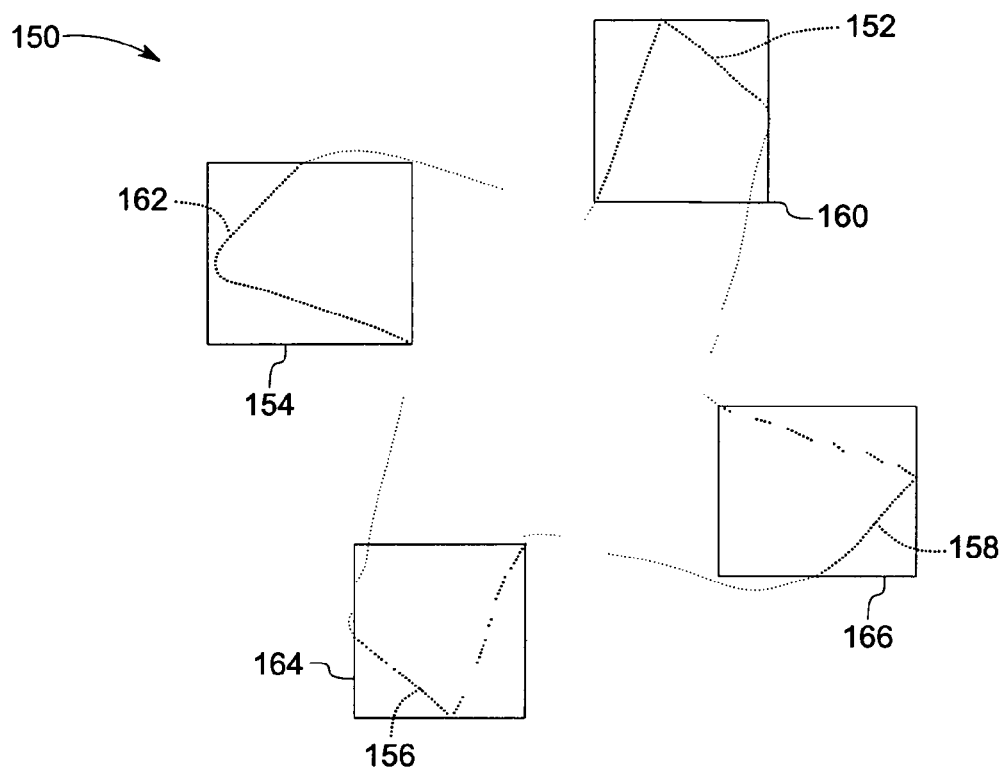
FIG. 10 is a diagrammatical illustration of segmentation of key features around an edge of the cutting tools of FIGS. 1 and 2 in accordance with aspects of the present technique.
Figure 11:
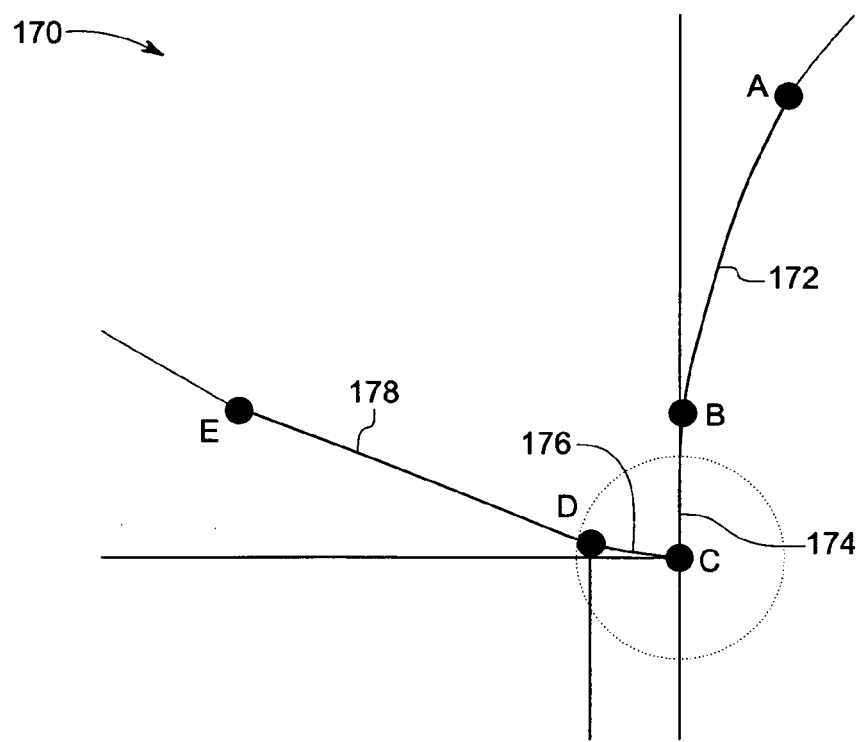
FIG. 11 is a diagrammatical illustration of curve fitting through the points obtained by segmentation of key features around the edge of the cutting tools of FIGS. 1 and 2 in accordance with aspects of the present technique.

FIG. 10 is a diagrammatical illustration of segmentation 150 of key features around an edge of the cutting tools 10 and 20 of FIGS. 1 and 2. In this embodiment, segmentation of key features for a radial section is illustrated. In the illustrated embodiment, the group of points such as represented by reference numerals 152, 154, 156 and 158 are grouped together to form segmented parts 160, 162, 164 and 166. Further, optimized global curve fitting is employed for the segmented parts 160, 162, 164 and 166. In one embodiment, a user of the system may select the key features via polygon selection technique. Further, the information related to the optimized curves may be made available to the user. FIG. 11 is a diagrammatical illustration of curve fitting 170 through the points obtained by segmentation of key features of FIG. 10. As illustrated, two segments for radial rake part are represented by an arc (AB) 172 and line (BC) 174. Further, for each of the radial primary relief part and the radial secondary clearance part one line segment may be used. In this embodiment, a line (CD) 176 represents the radial primary relief part and a line (DE) 178 represents the radial secondary clearance part.

Figure 12:
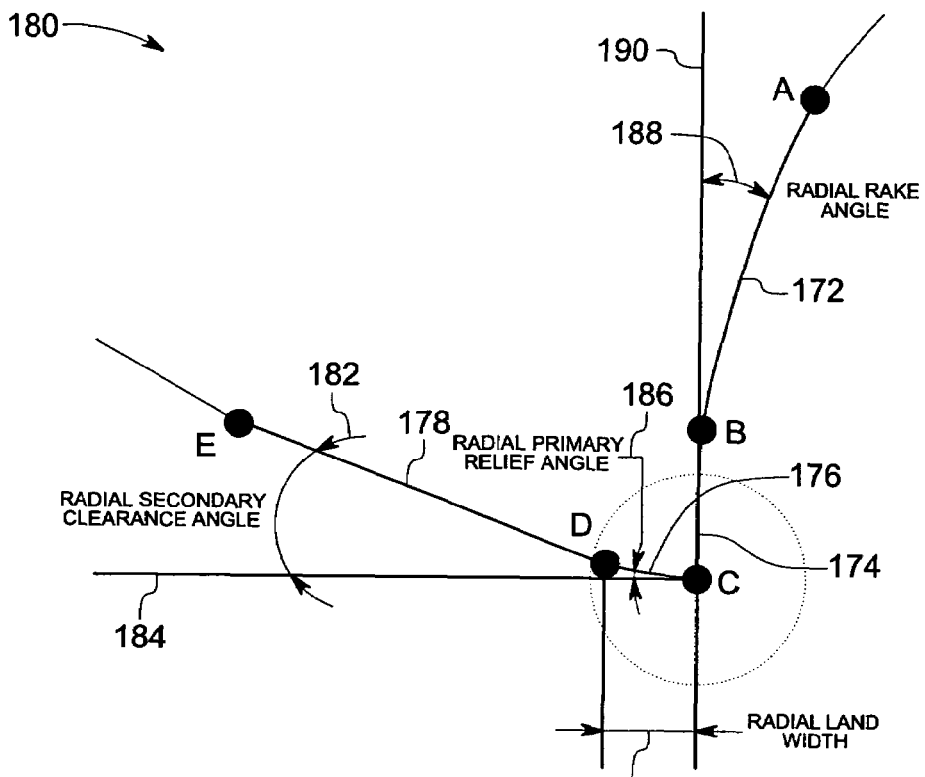
FIG. 12 is a diagrammatical illustration of exemplary cutting tool parameters extracted from the curves of FIG. 11 in accordance with aspects of the present technique.

FIG. 12 is a diagrammatical illustration of exemplary cutting tool parameters 180 extracted from the optimized curves of FIG. 11. The parameters estimated via the curves include radial secondary clearance angle 182 that is measured as the angle between the line segment (DE) 178 and a horizontal axis 184. Similarly, a radial primary relief angle 186 is measured as the angle between the line CD 176 and the horizontal axis 184. Further, a radial rake angle 188 is measured as the angle between the arc (AB) 172 and a vertical axis 190. As will be appreciated by those skilled in the art, the value of the radial rake angle 188 will be different on different measurement depths from the cutting edge point C. Additionally, a radial land width 192 is measured as a horizontal offset of the point D from the vertical axis 190. Thus, a plurality of parameters may be extracted for the cutting tool based upon the optimized curves.

Figure 13:
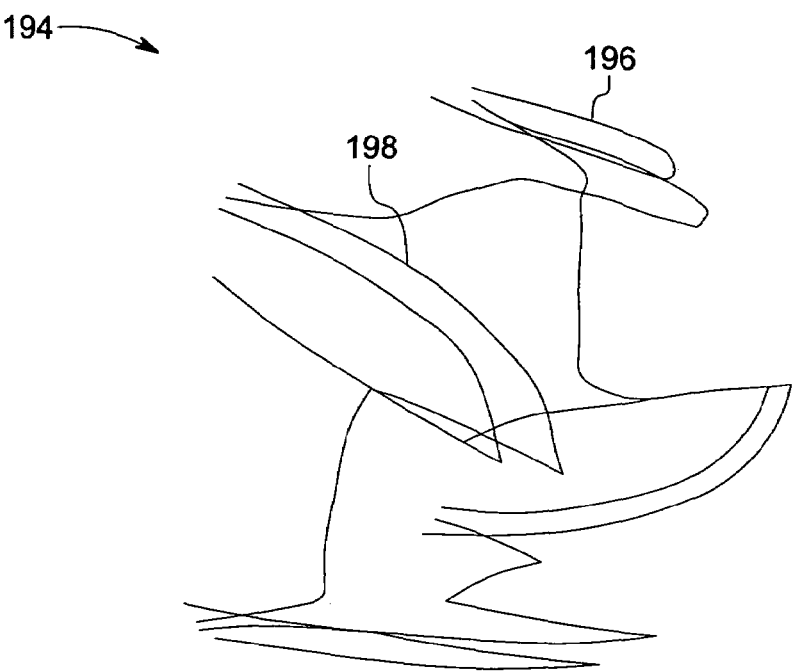
FIG. 13 is a diagrammatical illustration of exemplary axial sections obtained by virtual slicing of cutting tools of FIGS. 1 and 2 in accordance with aspects of the present technique.

FIG. 13 is a diagrammatical illustration of exemplary axial sections 194 obtained by virtual slicing of cutting tools 10 and 20 of FIGS. 1 and 2. The parameter extraction technique for an axial part is similar to the radial parameter extraction technique as described above. In the illustrated embodiment, two groups of axial sections such as represented by reference numerals 196 and 198 are utilized for axial parameter extraction as described below with reference to FIG. 14.

Figure 14:
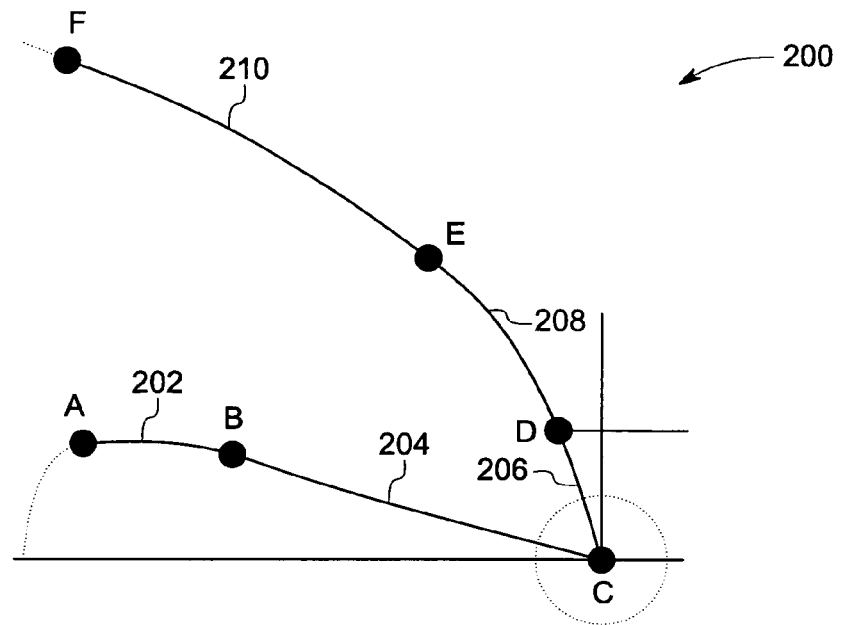
FIG. 14 is a diagrammatical illustration of curve fitting through the points obtained by segmentation of key features in the axial sections of FIG. 13 in accordance with aspects of the present technique.
Figure 15:
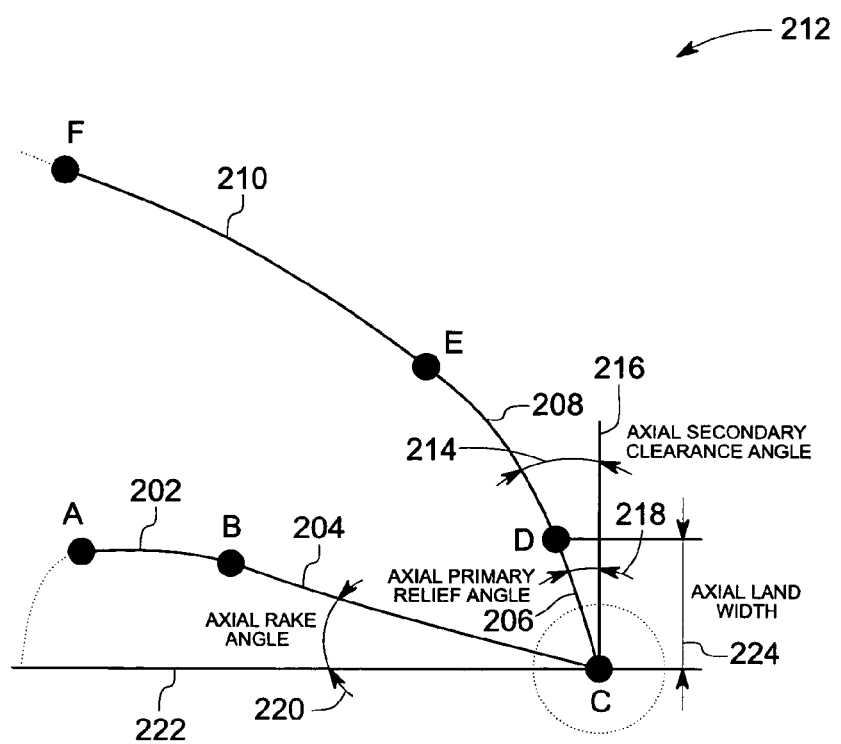
FIG. 15 is a diagrammatical illustration of exemplary cutting tool parameters extracted from the curves of FIG. 14 in accordance with aspects of the present technique.

FIG. 14 is a diagrammatical illustration of curve fitting 200 though the points obtained by segmentation of key features for the axial sections of FIG. 13. In this embodiment, an axial rake part is defined by an arc (AB) 202 and a line (BC) 204 and an axial primary relief part is represented by a line 206. Further, an axial secondary part is defined by arc (DL) 208 and arc EF (210). FIG. 15 is a diagrammatical illustration of exemplary cutting tool parameters extracted from the curves of FIG. 14. The parameters extracted via the curves include an axial secondary clearance angle 214 that is measured as the angle between arc DL 208 and a vertical axis 216. Further, an axial primary relief angle 218 is measured as the angle between the arc CD 206 and the vertical axis 216. In addition, an axial rake angle 220 is measured as an angle between the line BC 204 and a horizontal axis 222 which is parallel with the cutter shank axis and an axial land width 224 is measured as the vertical offset of point D from the horizontal axis 222. Thus, a plurality of parameters are extracted from the optimized curves of axial sections. Furthermore, a rotary axial projection technique may be employed to extract such parameters from the measurement data.

Figure 16:
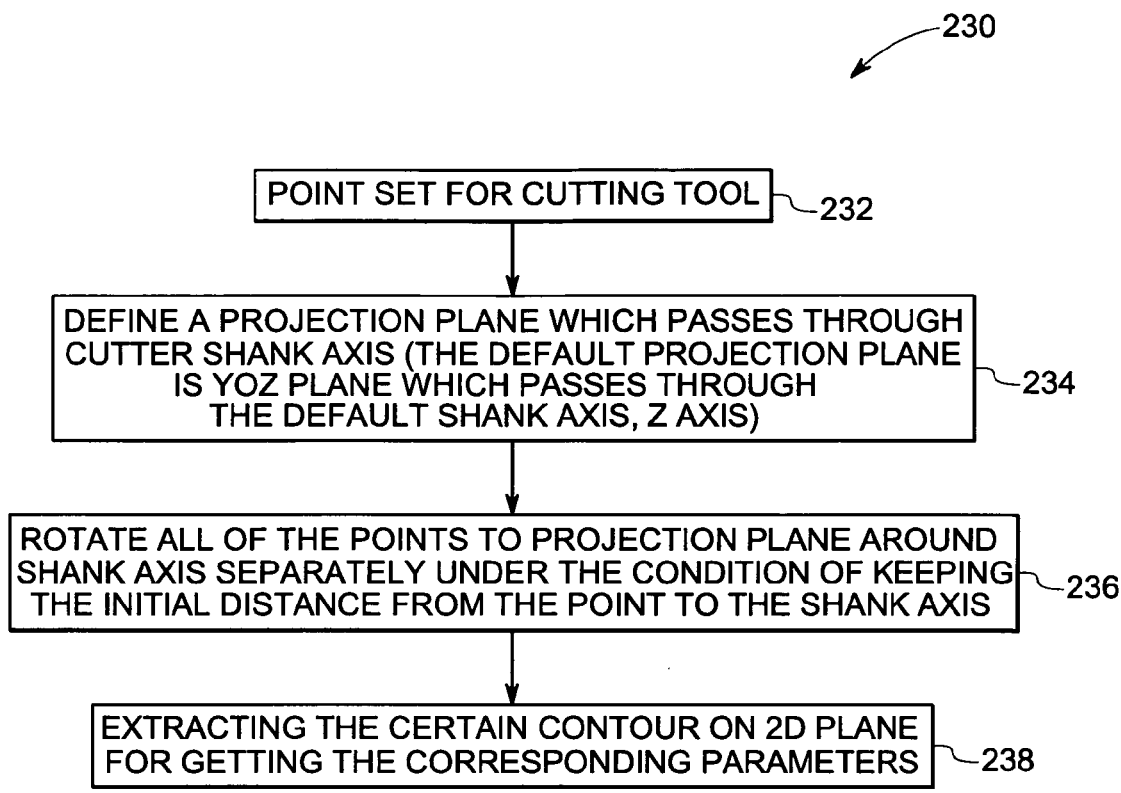
FIG. 16 is a diagrammatical illustration of an exemplary process of rotary axial projection for extracting parameters of the cutting tools of FIGS. 1 and 2 in accordance with aspects of the present technique.

FIG. 16 is a diagrammatical illustration of an exemplary process 230 of rotary axial projection for extracting parameters of the cutting tools 10 and 20 of FIGS. 1 and 2. In the illustrated embodiment, a point set is obtained for a cutting tool as represented by step 232. At step 234, a projection plane is defined that passes through the cutter shank axis. In this embodiment, the default projection plane is YOZ plane that passes through the default shank axis (i.e. z axis). Further, at step 236, all the points are rotated to the projection plane around the shank axis separately while maintaining the initial distance from each point to the shank axis. At step 238, a contour may be extracted on the two-dimensional plane for estimating the corresponding parameters. The parameter extraction for cutting tools 10 and 20 via the rotary axial projection technique is described below with reference to FIGS. 17 and 18.

Figure 17:
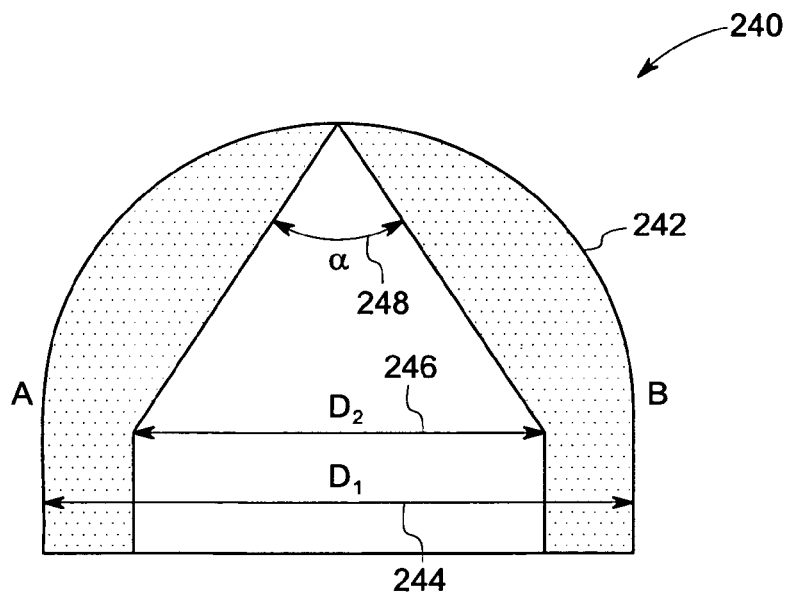
FIG. 17 is a diagrammatical illustration of rotary axial projection for the ball end mill of FIG. 1 in accordance with aspects of the present technique.

FIG. 17 is a diagrammatical illustration of parameter extraction via rotary axial projection 240 for the ball end mill 10 of FIG. 1. In this embodiment, the point set is rotated around the shank cutter axis and are projected to an axial plane 242. The projection technique includes an equal-radius rotation of each point. In this embodiment, the rotation angle for each point is less than 90 degrees. Further, parameters such as cutting diameter (D1) 244, core diameter (D2) 246 and axial gash angle ($\pi/2-\alpha/2$) 248 may be extracted from the rotary angle projection. In this embodiment, points on the minimum and maximum contours are extracted for estimating the cutting and core diameters 244 and 246.

Figure 18:
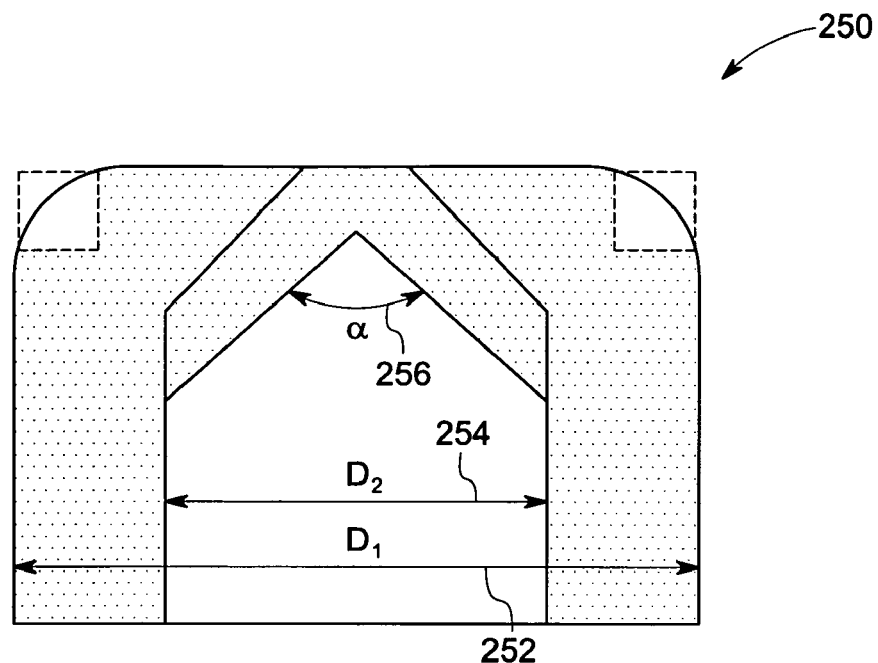
FIG. 18 is a diagrammatical illustration of rotary axial projection for the flat end mill of FIG. 2 in accordance with aspects of the present technique.
Figure 19:
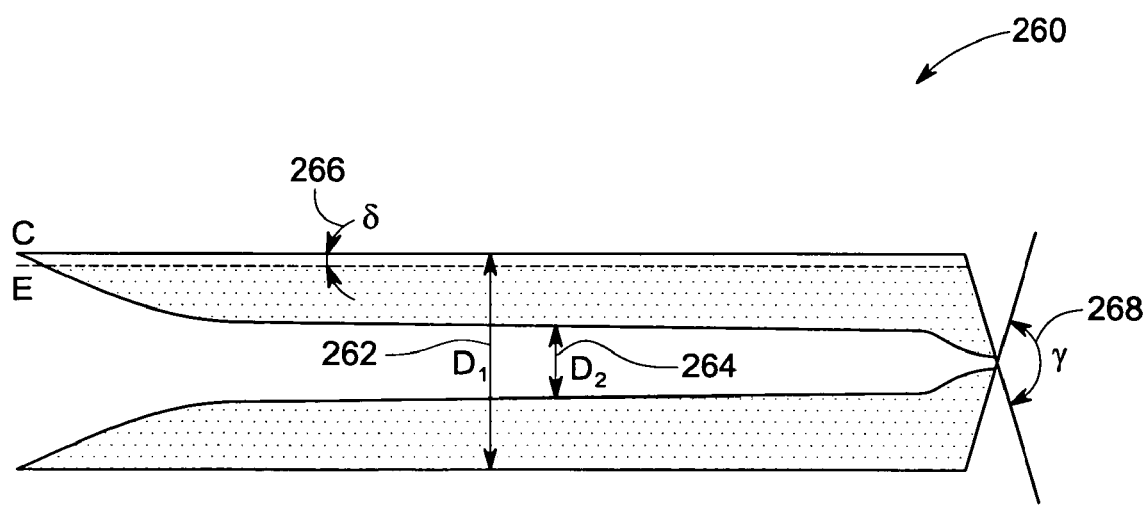
FIG. 19 is a diagrammatical illustration of rotary axial projection for a drill in accordance with aspects of the present technique.

FIG. 18 is a diagrammatical illustration of parameter extraction via rotary axial projection 250 for the flat end mill 20 of FIG. 2. In this embodiment, the rotary plane projection includes a semi-plane projection. As described earlier, parameters such as cutting diameter (D1) 252, core diameter (D2) 254 and axial gash angle ($\pi/2-\alpha/2$) 256 may be extracted from the rotary angle projection. FIG. 19 is a diagrammatical illustration of rotary axial projection 260 for a drill. In the illustrated embodiment, the rotation angle for each point is less than 90 degrees. Again, based upon the rotary axial projection 260 of a set of points for the drill a plurality of parameters such as cutting diameter (D1) 262, core diameter (D2) 264, back taper angle ($\delta$) 266 and point included angle ($\gamma$) 268 may be estimated. Thus, a plurality of parameters may be extracted via the rotary angle projection technique described above. Examples, of such parameters include helix angle, lead, shank diameter, cutting diameter, core diameter, axial gash angle, ball end radius for ball end mill 10, corner radius for flat end mill 20 and back taper and point included angle for drill.

Figure 20:
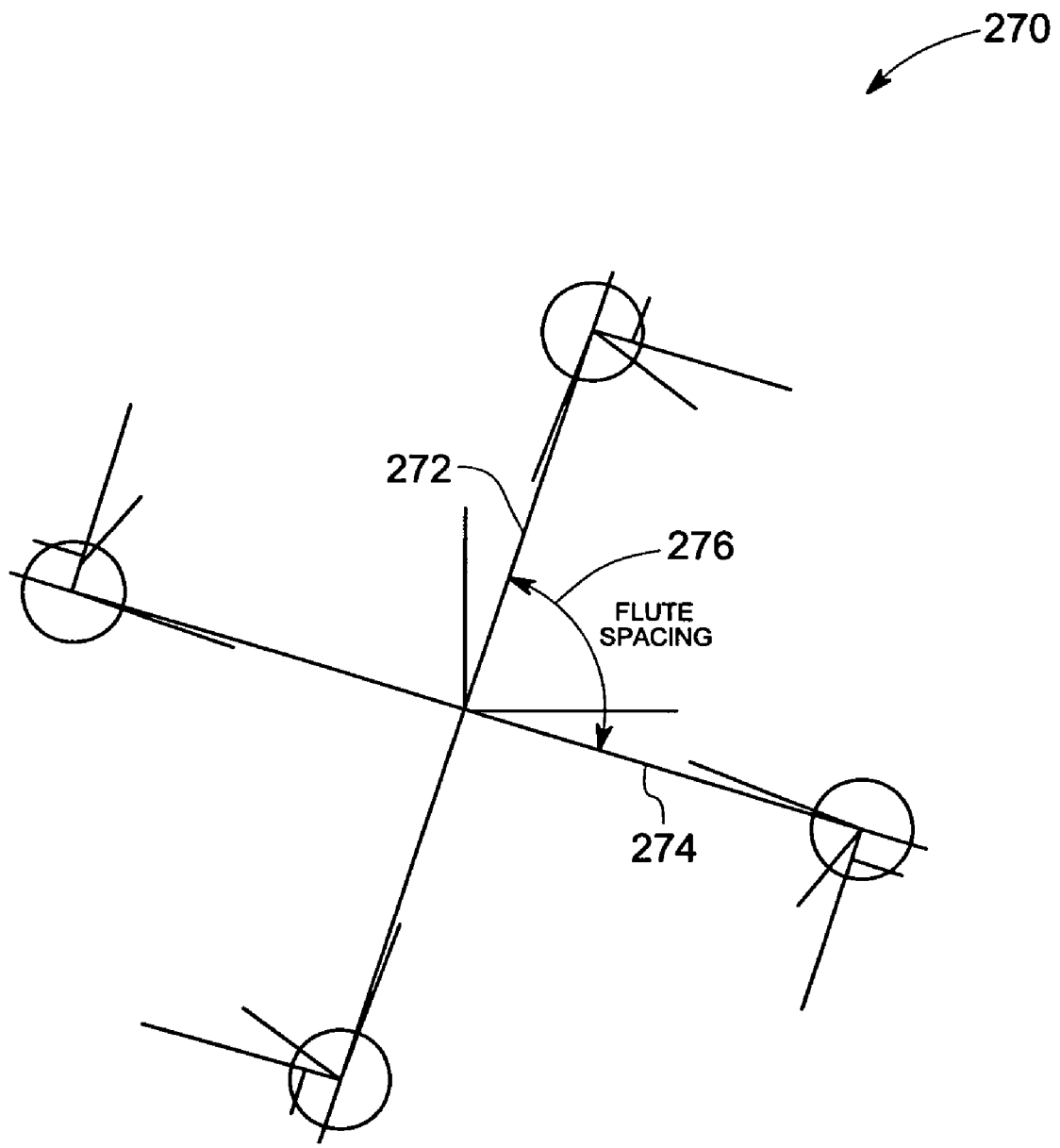
FIG. 20 is a diagrammatical illustration of flute spacing estimation of cutting tools of FIGS. 1 and 2 in accordance with aspects of the present technique

FIG. 20 is a diagrammatical illustration of flute spacing estimation 270 of cutting tools 10 and 20 of FIGS. 1 and 2. As used herein, the term "flute spacing" refers to the spacing angle between two cutting edges of a tool such as ball and flat end mills 10 and 20. The flute spacing estimation 270 is based upon the radial parameter extraction as described before. In operation, cutting edges such as represented by reference numerals 272 and 274 are obtained for a specified section. Further, a flute spacing 276 is measured as the included angle between two center lines that cross cutting edge points individually. As will be appreciated by one skilled in the art a user may select a plurality of multi curves for estimating the flute spacing between the cutting edges. Similarly, a plurality of other parameters may be determined based upon the virtual slicing and parameter extraction technique. For example, a helix rotary direction may be obtained from two adjacent sliced sections. Further, a concentricity also may be estimated for the cutting edges of the cutting tool.

The various aspects of the method described hereinabove have utility in parameter extraction of a variety of cutting tools such as ball end mill, flat end mill, drill and reamer. The technique described above enables accurate estimation of the tool parameters from measurement data without the need of slicing the original tool. As described above, a plurality of parameters may be obtained for the cutting tools via virtual slicing, curve fitting and parameter extraction techniques. Further, the parameter extraction via measurement data enables parameter extraction in relatively less time. In addition, such technique provides flexibility to a user of the system and is relatively inexpensive. Advantageously, the technique enables consistent measurement of all cutting tool dimensions for a variety of cutting tools.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for extracting parameters of a tool, comprising:
    obtaining a measurement data set having a point cloud corresponding to a surface of the tool;
    virtually slicing the point cloud at-least one pre-determined section to obtain a set of points on the pre-determined section;
    generating a plurality of curves through the set of points and optimizing the plurality of curves to generate optimized fitting curves; and
    extracting the parameters of the tool from the optimized fitting curves.

2. The method of claim 1, wherein obtaining the measurement data comprises scanning a surface of the tool via a three-dimensional (3D) measurement system.

3. The method of claim 2, wherein the 3D measurement system comprises a laser scanner, or a white light 3D scanner, or scanning contact probes.

4. The method of claim 1, wherein the tool comprises a ball end mill, or a flat end mill, or a drill, or a reamer.

5. The method of claim 4, wherein the parameters for the tool comprise a rake angle, or a primary relief angle, or a secondary clearance, or a land width, or a shank diameter, or a cutting diameter, or a core diameter, or combinations thereof.

6. The method of claim 1, wherein virtually slicing the point cloud comprises a plane slicing, or a surface slicing of the point cloud.

7. The method of claim 6, wherein virtually slicing the point cloud comprises radial slicing, or axial slicing, or cylindrical slicing, or a pre-determined direction slicing of the point cloud.

8. The method of claim 1, wherein generating the plurality of curves comprises segmenting a plurality of key features for the pre-determined section.

9. The method of claim 8, further comprising determining a number of curves for the plurality of key features at the pre-determined section.

10. The method of claim 8, wherein generating the plurality of curves comprises generating an arc, or a spline, or a line through the set of points through a least-square curve fitting technique.

11. The method of claim 10, further comprising creating constraints between adjacent curves for the generated plurality of curves.

12. The method of claim 1, wherein optimizing the plurality of curves comprises iteratively finding global minimum deviations between set of points and the plurality of curves via Levenberg-Marquardt method.

13. The method of claim 1, wherein extracting the parameters comprises extracting the parameters via a rotary axial projection technique.

14. A processor based system for extracting parameters of a tool, comprising:
    a 3D measurement device configured to scan a surface of the tool and to acquire a point cloud corresponding to the surface;
    a virtual slicing module configured to slice the point cloud corresponding to a surface of the tool to obtain a set of points at-least one pre-determined section;
    a curve fitting and optimization module configured to generate a plurality of curves through the set of points and to optimize the plurality of curves by minimizing deviations between the set of points and the plurality of curves; and
    a parameter extraction module configured to extract the parameters of the tool from the optimized curves.

15. The system of claim 14, wherein the virtual slicing module is configured to slice a point cloud, or a triangular mesh to obtain the set of points corresponding to the pre-determined section.

16. The system of claim 15, wherein the density of the point cloud is substantially high.

17. The system of claim 15, wherein the virtual slicing module is configured to slice the point cloud or the triangular mesh based upon a defined slicing thickness, or a user-defined section.

18. The system of claim 14, wherein the virtual slicing module is configured to perform a radial slicing, or an axial slicing, or a pre-determined direction slicing or a cylindrical slicing of the point cloud.

19. The system of claim 18, wherein the cylindrical slicing of the point cloud facilitates estimation of flute number points on a cutting edge of the tool.

20. The system of claim 14, further comprising a pre-processing module configured to pre-process the point cloud via noise filtering, or data compensation, or multi-view data merge, or combinations thereof.

21. The system of claim 14, wherein the tool comprises a ball end mill, or a flat end mill, or a drill, or a reamer.

22. The system of claim 21, wherein the parameters for the tool comprise a rake angle, or a primary relief angle, or a secondary clearance, or a land width, or a shank diameter, or a cutting diameter, or a core diameter, or combinations thereof.

23. A method for virtually slicing a point cloud at a pre-determined section corresponding to a surface of a tool, comprising:
   pre-processing the point cloud via a filter to generate a first set of points;
   selecting a slicing plane for segmenting the first set of points;
   projecting the first set of points to the selected slicing plane to generate a second set of points at a specified section; and
   determining parameters corresponding to the tool based upon the second set of points.

24. The method of claim 23, wherein the slicing plane comprises an axial plane, or a radial plane, or a cylindrical plane.

25. The method of claim 24, further comprising specifying a slicing thickness for the slicing plane based upon a point density of the set of points.

26. The of method claim 23, wherein the point cloud comprises a triangular mesh model.

27. The method of claim 26, further comprising estimating intersection points between the slicing plane and borders of each triangle of the triangular mesh model.

28. A memory storing a computer program for estimating parameters of a tool, comprising:
   code for virtually slicing a point cloud corresponding to a surface of the tool at a pre-determined section to obtain a set of points on the pre-determined section;
   code for generating a plurality of curves through the set of points and optimizing the plurality of curves to generate optimized fitting curves; and
   code for extracting the parameters from the optimized fitting curves.

29. The memory of claim 28, further comprising code for pre-processing the point cloud via noise filtering, or data compensation, or multi-view data merge, or combinations thereof.

* * * * *